Aug. 10, 1965     A. H. GOREY     3,199,427
AUTOMATIC SHUTTER COCKING MECHANISM FOR CAMERA
Filed May 13, 1963     3 Sheets-Sheet 1

INVENTOR.
ARCHIE H. GOREY
BY
Attorney

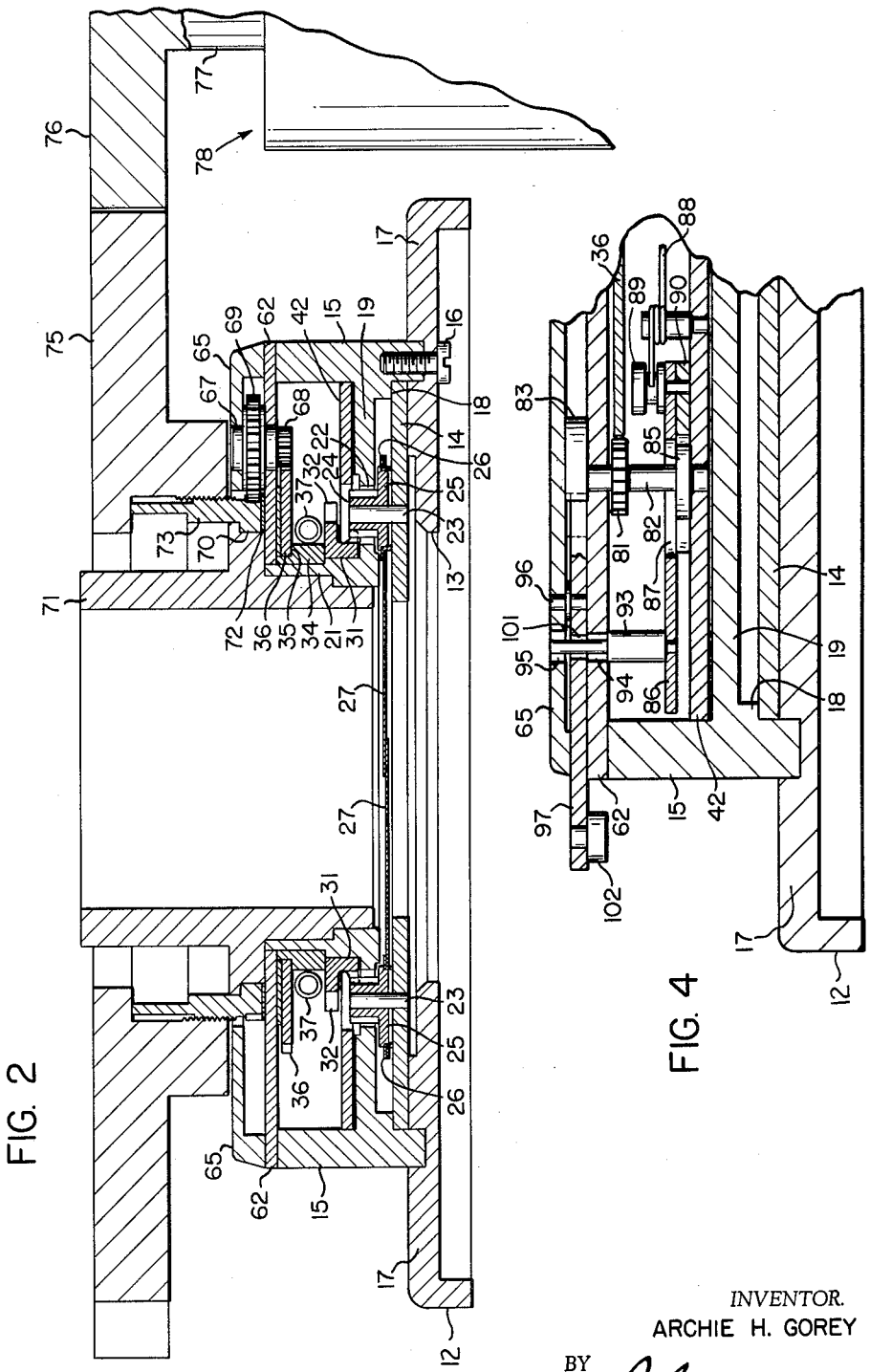

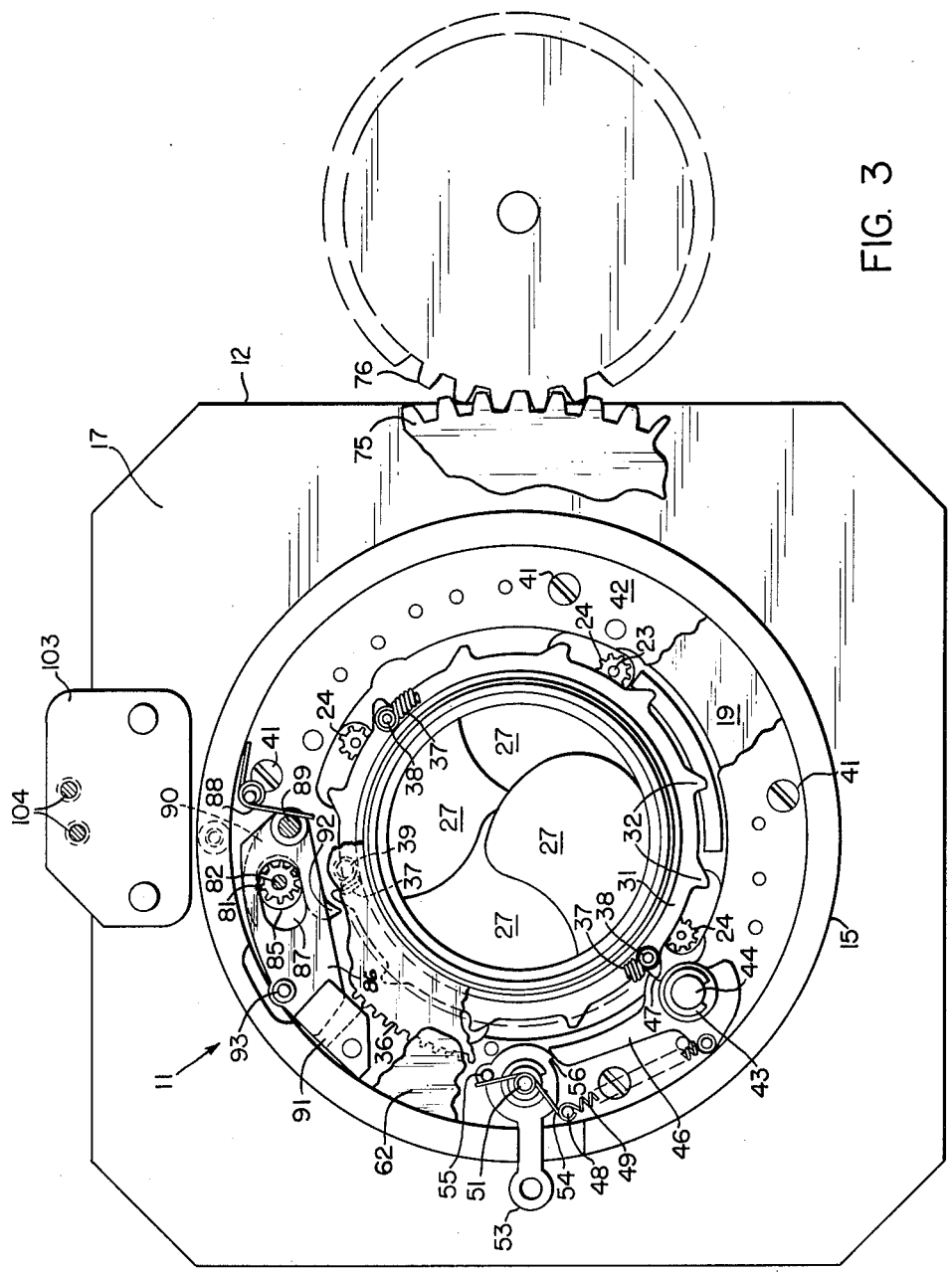

United States Patent Office 3,199,427
Patented Aug. 10, 1965

3,199,427
AUTOMATIC SHUTTER COCKING MECHANISM
FOR CAMERA
Archie H. Gorey, Rochester, N.Y., assignor to Graflex,
Inc., Rochester, N.Y., a corporation of Delaware
Filed May 13, 1963, Ser. No. 280,021
9 Claims. (Cl. 95—53)

The present invention relates to cameras, and more particularly to shutter cocking mechanisms for cameras. Still more specifically, the invention relates to a mechanism for automatically cocking the shutter of a still camera equipped with a between-the-lens shutter.

In cameras of the type described, it heretofore has been necessary to manually recock the shutter after it has been tripped. Various types of devices have been designed for mechanically recocking or rewinding such camera shutters, but such devices require at least some manual operation on the part of the person operating the camera, thus precluding complete remote control thereof. Thus, while it has been possible at least to release the shutter by means of remote control, heretofore there has been no practical means for automatically recocking the shutter so as to ready it for an ensuing picture taking operation. This drawback has been particularly serious, for instance, where it is desired to take pictures from a missile or satellite.

One object of this invention is to provide a camera having a shutter which automatically rewinds or reccoks itself after firing so that it is ready for use to take another picture.

A further object of this invention is to provide an improved, still-life camera which is capable of taking a plurality of pictures, while being controlled from a point remote from the camera, and in which the shutter is recocked automatically after the taking of each picture.

Still another object of the invention is to provide a between-the-lens shutter usable on a camera in a satellite or missile and which will automatically recock itself after each picture taking operation.

Other objects of the invention will be apparent hereinafter from the specification and from the recital of the appended claims, particularly when read in conjunction with the accompanying drawings.

In the drawings:

FIG. 2 is an enlarged fragmentary transverse sectional view taken substantially along the line 2—2 in FIG. 1, looking in the direction of the arrows;

FIG. 3 is a section in a plane parallel to the view of FIG. 1, and showing in more detail parts of the shutter recocking mechanism; and FIG. 4 is a fragmentary sectional view taken along the line 4—4 in FIG. 1, looking in the direction of the arrows.

Figure 1:
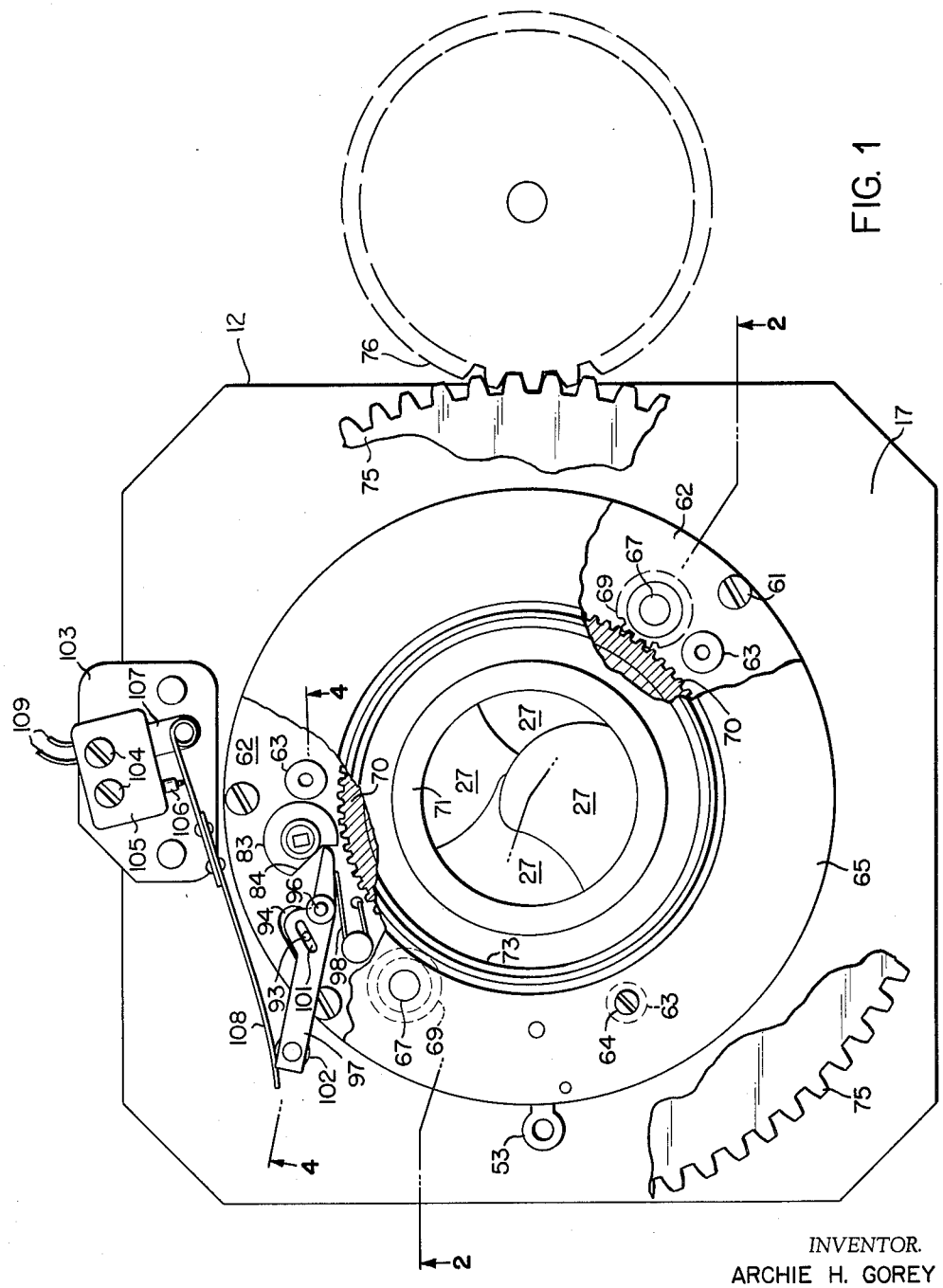
FIG. 1 is a fragmentary front elevation of a between-the-lens shutter made in accordance with one embodiment of this invention, parts being cut away better to illustrate the construction.

In the embodiment of the invention illustrated, upon tripping of the trigger, a latch is disengaged from a toothed wheel, and the wheel begins to rotate under actuation of coiled springs. As the wheel revolves it rotates pinions which drive eccentrics that open and close the shutter leaves. As the springs run down a tooth of the wheel engages a tooth on a sliding and pivotal brake plate and causes that brake member to move against resistance of a spring. A pin carried by the brake member causes a lever to pivot in a direction to cause a leaf spring to close a normally-open switch thereby closing a circuit to an electric motor. The motor then drives the toothed wheel to retension the coiled springs previously referred to and to disengage the tooth of the brake member from the toothed wheel, and to reposition it ready for the next operation, and thereby opens the switch stopping the motor. The latch once again holds the toothed wheel against return. Thus the shutter will be recocked.

Referring now to the drawings by numerals of reference, 12 denotes a lens board having a lateral flange 17 (FIGS. 2 and 4) on which the between-the-lens shutter mechanism 11 (FIG. 1) is mounted. The flange 17 has a central opening 13 (FIG. 2) therethrough in which the back lens element (not shown) is mounted. The shutter is encased in a housing 15 the rear end of which is secured by means of screws 16 to the flange 17 coaxially of opening 13. The rear end of housing 15 is counterbored to form a shoulder 18 against which the shutter leaf plate 14 is seated, and held by flange 17. Integral with the shutter housing, and projecting radially inwardly thereof in axially spaced relation to the shutter leaf plate 14, is a flange 19 (FIGS. 2 and 4), with which an annular bearing sleeve 21 is integral. Sleeve 21 projects axially forwardly beyond flange 19 in radially spaced coaxial relation with the annular wall of housing 15. The flange 19 has therethrough four circular openings 22 (FIG. 2) which are equiangularly spaced from one another. Each of four stationary studs 23 (FIGS. 2 and 3) is secured at one end in the shutter leaf plate 14 and projects vertically upwardly therefrom through one of the holes 22 in the flange 19. Rotatably mounted on each of the studs 23 is a spur pinion 24. Integral with each pinion 24 to rotate therewith in the space between flange 19 and the shutter leaf plate 14 is an eccentric 25 (FIG .2). Rotatably mounted on the lower end of each eccentric 25 is the hub 26 of a shutter leaf 27. The mountings of the four shutter leaves 27 are like that disclosed in my prior U.S. Patents Nos. 2,593,873 and 2,701,992, and need not be described in detail here.

The spur pinions 24 mesh with the teeth of a master gear 31 which is rotatably mounted on sleeve 21. Integral with the master gear 31 is a toothed ring 32 (FIG. 2). Mounted on sleeve 21 in front of toothed ring 32 is an annular bearing 34 (FIG. 2) which is of reduced diameter at its front end to form an external shoulder 35. Seated on shoulder 35 and surrounding bearing 34 for rotation thereabout is a spur gear 36.

Housed in the space between the toothed wheel 32 and the spur gear 36, and extending about diametrally opposite portions of bearing 34 are two, coiled tension springs 37 (FIGS. 2 and 3). Each of the two springs 37 is fixed at one end to one of two posts 38, that are secured to the toothed wheel 32 at diametrally opposite points thereon (FIG. 3), and at its opposite end to one of two posts 39 (only one of which is illustrated in FIG. 3) which are secured to and project downwardly from the gear 36 at diametrally opposite points thereon. When they are tensioned, the springs 37 tend to rotate the wheel 32 clockwise in FIG. 3 in a manner to be described below.

Secured by screws 41 (FIG. 3) to the front face of the flange 19 in the radial space between the toothed wheel 32 and the housing 15 is an annular plate 42. Secured by a C-clip 43 to pivot about a stationary post 44 carried on the front face of plate 42 is a latch lever 46 (FIG. 3). Integral with the lever 46 and engageable with the teeth of toothed member 32 is a latching dog 47. Connected at one end to the latch member 46 and at its opposite end to a stationary pin 48 on plate 42 is a coil spring 49 which tends constantly to urge latch 46 in a clockwise direction in FIG. 3 so that dog 47 tends to engage one of the teeth of the toothed member thereby to hold the shutter in cocked position.

Mounted to rotate about a further stationary post 51 (FIG. 3) carried on the upper face of plate 42 is a shutter trigger lever 53, which extends radially outwardly through a slot in housing 15 to the exterior thereof. Also mounted on post 51 is a coil spring 54, one end of which engages the stationary post 48 and the opposite end of which engages a pin 55 carried on the hub of the trigger lever 53 so that the latter is constantly urged in a clockwise direction (FIG. 3) about post 51. The trigger lever has a shoulder 56 on its hub which, in a manner to be described more fully below, is adapted to control the position of latch 46.

Seated on the front face of bearing 34 and the annular wall of housing 15, and secured to the latter by a plurality of screws 61 (only one of which is illustrated in FIG. 1), is a plate 62 (FIGS. 1, 2 and 4). Secured by screws 64 to plate 62 is a ring 65, which is spaced from plate 62 by spacers 63.

Journaled at opposite ends in the rings 65 and 62, respectively, are two shafts 67 (FIGS. 1 and 2). Secured to the rear end of each shaft 67 to rotate therewith in mesh with the gear 36, is a pinion 68 (FIG. 2). Secured to each shaft 67 intermediate the ends thereof to rotate in the space between rings 65 and 62 is a further pinion 69, which is larger than pinion 68. Pinions 69 mesh with a gear 70, which is rotatably mounted on the housing 71 of the front lens of the camera. A washer 72 spaces gear 70 from plate 62. Integral with gear 70 is a winding sleeve 73 (FIG. 2). Threaded on the winding sleeve 73 is the winding gear 75. Gear 75 meshes with a spur gear 76 which is secured to the armature shaft 77 of an electric motor 78 (FIG. 2) carried by the camera housing adjacent the shutter mechanism.

When the dog 47 on the latch member 46 is engaged with a tooth of the wheel 32 as shown in FIG. 3, clockwise rotation of the winding gear 75 will be transmitted through gears 70, 69, and 68 to the gear 36, whereby the latter is rotated clockwise relative to the wheel 32 thereby to tension the springs 37, that is, to cock the shutter.

Gear 36 also meshes with a pinion 81 (FIGS. 3 and 4) which is secured to a rotatable shaft 82 to rotate therewith beneath plate 62 in the radial space between housing 15 and sleeve 21. Opposite ends of shaft 82 are journaled in the plates 42 and 62, respectively. Secured to the front end of shaft 82 to rotate therewith in the axial space between plate 62 and cover 65 is a disk cam 83 (FIGS. 1 and 4) which has a notch 84 (FIG. 1) in its peripheral surface. Secured to shaft 82 behind pinion 81 to rotate therewith is an eccentric 85.

Seated on the upper face of plate 42 for sliding movement thereon is a flat plate or shutter brake 90. At one end thereof brake 90 has therein an open ended slot the sidewalls of which engage and surround the eccentric 85. Brake 90 is constantly urged toward the left in FIG. 3 by a coil spring 88 (FIGS. 3 and 4) which is mounted on the upper face of plate 42, and which engages a pin 89 carried by the brake 90 at its opposite end. At its open end brake 90 has an integral tooth or dog 92 which projects radially inwardly toward the wheel 32 to be engageable with one of its teeth when the brake 90 is in the position shown in FIG. 3. A plate 86 is pivotally attached at one end to the pin 89 on the brake 90, and slides back and forth with the brake. Plate 86 has therein an elongate slot 87 through which the shaft 82 projects. At its opposite end plate 86 is disposed behind an overhanging plate 91 (FIG. 3) which is secured at one end to the face of plate 42. Plate 86 carries a pin 93 which extends through aligned slots 94 and 95 (FIG. 4) in plate 62 and cover 65, respectively.

A pivot pin 96 for a cam follower arm 97 is secured to the arm, and extends therefrom forwardly into cover 65 and rearwardly into plate 62 (FIGS. 1 and 4). Arm 97 is constantly urged in a counterclockwise direction in FIG. 1 by means of a coil spring 98, which is mounted on plate 62, and which engages and urges the inner end of the follower arm 97 into engagement with the cam 83 carried by the shaft 82. The follower arm 97 has an elongate, diagonal slot 101 in which pin 93 engages and slides. At its outer end arm 97 extends radially outwardly through a slot in cover 65 and has rotatably mounted thereon a roller 102.

Secured to the face of the lens board 12 is a microswitch mounting plate 103 on which is fastened by screws 104 a normally-open microswitch 105 (FIG. 1) which has a switch actuating plunger 106 slidably projecting from one side thereof. Secured at one end to a lug 107 on switch 105, and extending over the free end of the switch plunger 106 and into engagement with the roller 102 is a flexible switch actuating blade 108.

For use, the motor 78 is connected to a power source so as to be responsive to switch 105. When the shutter is in cocked position, as shown in FIGS. 1 and 3, the shutter leaves 27 are closed; and the springs 37 are under tension, and one of the teeth of toothed wheel 32 is engaged by the dog 47 on the latch member 46. The brake 90 is at this time urged and held by spring 88 in its leftmost position in FIG. 3 so that the dog 92 thereon projects into the path of movement of the teeth of the toothed wheel 32; and the plunger 106 of switch 105 is in its outermost position so that the switch is held in its normally open position.

To open the shutter leaves 27 for the purpose of taking a picture, trigger 53 is pivoted counterclockwise about post 51. This permits the free end of the latch member 46 to drop off the larger diameter portion of the hub of the trigger under the urging of the drive springs 37 through the toothed ring 32. When trigger 53 is released and returned clockwise to its normal position by spring 54, and after the toothed ring 32 leaves the dog 47 on latch 46, latch 46 is returned to its normal position by spring 49, ready to engage the next tooth on the toothed ring 32. The master gear 31 rotates with wheel 32 and drives the four pinions 24 to open and then close the shutter leaves 27 as described in my above-noted U.S. patents.

Near the end of the above-described partial rotation of wheel 32, and after the shutter leaves 27 have completed an exposure and are returning to closed positions, one of the teeth of wheel 32 engages the dog 92 on the brake 90 and shifts the latter to the right in FIG. 3 against the action of spring 88. This stops wheel 32 just before the next tooth of wheel 32 reaches dog 47 on latch 46. As the brake 90 shifts to the right it carries with it plate 86 and pin 93 which therefore slides to the right end (FIG. 1) of the inclined slot 101 and moves arm 97 clockwise about pin 96, disengaging the inner end of the arm from the notch 84 in the cam 83, and causing roller 102 to pivot blade 108 clockwise so that it forces plunger 106 inwardly thereby closing switch 105 completing the circuit to motor 78. Motor 78 thereupon drives pinion 76, winding gear 75, gear 70, pinions 69 and 68, and gear 36. As gear 36 rotates it tensions the springs 37, the dog 92 on the brake 90 at this time being engaged with one of the teeth on the ratchet wheel 32 so that the latter is prevented from rotating clockwise with gear 36. As the gear 36 rotates it also causes the pinion 81 meshed therewith to rotate one revolution in a counterclockwise (FIG. 3) direction. The rotation of pinion 81 causes cam 83 and the eccentric 85 to make one revolution also. During its revolution, the eccentric 85 causes the brake 90 to shift, first, radially outwardly to disengage dog 92 from wheel 32, thereby permitting the latter to rotate slightly further until one of its teeth reengages the dog 47 on the latch member 46 which is now in its latching position; and thereafter to shift radially inwardly toward the center of the shutter mechanism so that dog 92 assumes the position shown in FIG. 3. During this radial shifting of brake 90 the rotating cam 83 engages the inner end of the follower arm 97 and urges the latter clockwise so that it maintains switch 105 closed until the notch 84 in cam 83 is once again rotated into position beneath the inner end of arm 97, at which time the latter drops into notch 84 in response to spring 98, thereby causing counterclockwise rotation of arm 97 and consequent release of leaf spring 108, so that the plunger 106 returns to its outer position, opening switch 105 and stopping motor 78. The parts are thus returned to their respective positions as illustrated in FIGS. 1 and 3, and the cycle is ready to be repeated on the next operation of trigger 53.

From the foregoing it will be apparent that relatively simple and compact means has been provided for automatically rewinding a shutter mechanism of a still-picture camera. Since it is a relatively simple matter to provide a conventional means for operating trigger 53 from a point remote from the camera, in a missile or satellite trigger 53 can be tripped by remote control through radio-operated means. By eliminating the need for manually recocking the camera between the taking of successive pictures, the above-disclosed automatic rewinding device can therefore be employed for photographic purposes in a satellite. By eliminating the need for manual rewind, applicant's device also minimizes the possibility of accidentally knocking other adjustments on the camera out of alignment during manual rewind.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A shutter for photographic cameras comprising
  (a) a housing,
  (b) a shutter leaf movably mounted in said housing,
  (c) a first member connected to said shutter leaf and movable to actuate said shutter leaf to move it to and from closed position,
  (d) a second member movably mounted on said housing,
  (e) resilient means interconnecting said members and operative, when tensioned, to urge said first member in a direction to actuate said shutter leaf,
  (f) an electric motor connected to said second member and operable to move the latter relative to said first member thereby to tension said resilient means,
  (g) a switch for starting and stopping said motor,
  (h) trigger means for releasably holding said first member against the resistance of said resilient means when the latter is tensioned,
  (i) a brake member movably mounted on said housing in a position to engage and stop said first member after said first member has been released and after said first member has moved in said direction a distance sufficient to open and close said shutter leaf, and
  (j) control means operable by said brake member to actuate said motor upon movement of said brake member by said first member, said control means including
  (k) a switch actuating arm connected to said brake member and movable thereby to actuate said switch to start said motor upon engagement of said first member with said brake member, and
  (l) means for stopping the operation of said motor when said motor has tensioned said resilient means,
  (m) a switch actuating arm connected to said brake member and movable thereby to actuate said switch to start said motor upon the engagement of said first member with said brake member.

2. A shutter for photographic cameras as defined in claim 1, wherein said stopping means comprises
  cam means connected to said arm and to said cocking means and movable by the latter to cause said brake member to disengage said first member and said switch actuating arm to deactuate said switch, after the tensioning of said resilient means.

3. A shutter for photographic cameras comprising
  (a) a housing,
  (b) a shutter leaf movably mounted in said housing,
  (c) a rotatable shutter actuating member mounted on said housing and connected to said shutter leaf to actuate the latter upon the rotation of said actuating member a predetermined distance in one direction,
  (d) a shutter cocking member mounted on said housing for rotation coaxially of said actuating member,
  (e) resilient means for interconnecting said members and operative, when tensioned, to urge said actuating member in said one direction,
  (f) cocking means connected to said cocking member and operable to rotate the latter relative to said actuating member thereby to tension said resilient means,
  (g) trigger means for releasably holding said actuating member against the resistance of said resilient means when the latter is tensioned,
  (h) a brake arm connected to said cocking means to be engaged and moved by said actuating member, upon the rotation thereof slightly beyond said predetermined distance, from an inactive position to an active position in which it actuates said cocking means, and
  (i) rotatable cam means connected to said arm and rotatable by said cocking member to return said arm to its inactive position to interrupt the actuation of said cocking means when said resilient means is tensioned.

4. A shutter for photographic cameras as defined in claim 3, wherein said cocking means comprises
  (a) an electric motor connected to said cocking member to rotate the latter, and
  (b) a switch for actuating said motor, and wherein
  (c) a pivoted switch actuating arm is connected to said brake arm and movable thereby to engage said switch to actuate said motor when said brake arm moves to its active position, and said cam means comprises
  (d) a first cam for moving said brake arm back to its inactive position during the rotation of said cocking member, and
  (e) a second cam for maintaining said switch actuating arm in engagement with said switch until said resilient means is tensioned.

5. A shutter for photographic cameras comprising
  (a) a housing having a central opening therethrough,
  (b) a movable shutter leaf mounted in said housing across said opening,
  (c) a toothed wheel mounted on said housing coaxially of said opening to rotate intermittently in one direction, and haivng a plurality of equiangularly-spaced teeth projecting from its outer peripheral surface,
  (d) means connecting said wheel to said shutter leaf and operative to actuate the latter upon the rotation of said wheel a predetermined distance in said one direction,
  (e) a rotatable spur gear mounted on said housing in coaxial relation to said wheel,
  (f) at least one spring interconnecting said wheel and gear,
  (g) cocking means for rotating said gear relative to said wheel thereby to tension said spring,
  (h) a trigger-operated detent engageable with said wheel releasably to hold said wheel against rotation in said one direction,
  (i) a brake arm movably mounted on said housing adjacent the periphery of said wheel and engageable with one of the teeth thereon each time said trigger detent is operated to release said wheel, thereby temporarily to stop the rotation of said wheel after it has rotated a distance at least equal to said predetermined distance, but slightly less than the angular distance between any two of the teeth on said wheel, (j) control means operable by said brake arm to actuate said cocking means upon the engagement of one of said teeth with said brake arm, and including (k) cam means operable by said gear to disengage said arm from said one tooth and to interrupt the actuation of said cocking means, when said spring has been once again tensioned, and (l) means for moving said trigger-operated detent to operative position to reengage and hold said wheel against rotation immediately after the disengagement of said arm from said one tooth.

6. A shutter for photographic cameras as defined in claim 5 wherein said cocking means comprises (a) an electric motor,
(b) a gear train connecting the armature of said motor to said spur gear to rotate the latter upon the operation of said motor, and
(c) a switch connected to said motor and operable during the engagement of said arm with a tooth of said wheel to operate said motor, and wherein said control means comprises
(d) a switch actuating arm pivoted on said housing,
(e) a pin carried by said brake arm and slidable in a slot in said switch actuating arm to pivot the latter into engagement with said switch upon the engagement of said one tooth with said brake arm thereby to operate said switch and motor, and said cam means comprises
(f) a first cam engageable with said brake arm to shift said brake arm radially outwardly to disengage it from said one tooth on said wheel, and then radially inwardly in a position to be engaged by the next successive tooth on said wheel, and
(g) a second cam engageable with said switch actuating arm to hold it in engagement with said switch until said resilient means is tensioned.

7. A shutter for photographic cameras comprising
(a) a housing containing a movable shutter leaf,
(b) a pair of axially spaced toothed members mounted on said housing for rotation coaxially of one another,
(c) resilient means interconnecting said members,
(d) means connecting one of said members to said shutter leaf to actuate the latter upon the rotation of said one member in one direction,
(e) means on said housing for intermittently rotating the other of said members relative to said one member to tension said resilient means,
(f) releasable trigger means for holding said one member against rotation during the rotation of said other member, and against the resistance of said resilient means when the latter is tensioned,
(g) a motor mounted adjacent said housing,
(h) a gear train connecting the armature of said motor to said other member to rotate the latter upon the actuation of said motor,
(i) a switch mounted on said housing and operable to close an electrical circuit to said motor,
(j) a pinion mounted on said housing for rotation by said other member when the latter is rotated,
(k) a brake plate mounted on said housing for limited sliding movement transverse to the axis of rotation of said pinion and having a detent projecting from one side thereof,
(l) an eccentric rotatable with said pinion and engageable in an elongate slot in said brake plate,
(m) said one member having a pluraltiy of teeth projecting from its peripheral surface at equi-angularly spaced points thereabout, said eccentric being operative to position said brake plate so that its detent is disposed between two angularly adjacent teeth on said one member, when said one member is held against rotation by said trigger means, and one of said two teeth being operative to strike said detent upon the release of said one member, and after the latter has actuated said shutter leaf, thereby to shift said brake plate in the direction of said slot and relative to said eccentric,
(n) a switch actuating arm connected to said brake plate and movable to actuate said switch and said motor upon the last-named shifting of said plate, said eccentric upon the rotation thereof being operative to move said plate so that its detent successively shifts out of engagement with said one ratchet tooth and then into the space between it and the next successive tooth on said wheel,
(o) said trigger means including a further detent engageable with a tooth to hold said one member against rotation in said one direction, and
(p) a cam rotatable with said eccentric to engage and hold said switch actuating arm in contact with said switch, and operative upon continued rotation of said eccentric to release said switch actuating arm after said resilient means is tensioned.

8. A shutter for photographic cameras as defined in claim 7, wherein
(a) said other member is operative to rotate said pinion one revolution each time said other member is rotated, and
(b) said cam is operative to hold said switch actuating arm in contact with said switch until said brake plate detent has been shifted into said space between said one and said next successive ratchet tooth, respectively.

9. A shutter for photographic cameras comprising
(a) a housing,
(b) a shutter leaf movably mounted in said housing,
(c) a toothed wheel connected to said shutter leaf and rotatable in one direction to open and close said shutter leaf,
(d) a rotary member mounted coaxially with said toothed wheel,
(e) a first spring interconnecting said first member and wheel and operative, when tensioned, to urge said toothed wheel in said one direction,
(f) a trigger-operated dog releasably engageable with a tooth of said wheel to hold said wheel and said shutter in cocked position against the resistance of said spring,
(g) means constantly urging said dog to tooth-engaging position,
(h) a reciprocable brake member,
(i) resilient means constantly urging said brake member in one direction,
(j) a second dog carried by said brake member in position to lie normally in a space between adjacent teeth of said wheel and adapted to be engaged by a tooth of said wheel, when the first-named dog is released, to move said brake member against the resistance of said resilient means thereby to brake said wheel,
(k) an electric motor drivingly connected to said rotary member to rotate said rotary member in a direction to tension said first spring,
(l) a switch for controlling the operation of said motor,
(m) means carried by said brake member and operative upon the last-named movement of said brake member to close said switch to energize said motor while said second dog holds said wheel against rotation, and
(n) means operatively connected to said rotary member and operative upon rotation of said rotary member by said motor a predetermined distance in spring-tensioned direction to move said second dog out of operative position relative to said wheel to release said wheel to permit it to complete its movement in its said one direction, and (o) means for thereafter opening said switch.

References Cited by the Examiner

UNITED STATES PATENTS

| | | | |
|---|---|---|---|
| 3,008,371 | 11/61 | Brault | 88—18 |
| 3,057,280 | 10/62 | Weise | 95—63 X |

NORTON ANSHER, *Primary Examiner.*

JOHN M. HORAN, *Examiner.*